Aug. 29, 1944.  F. B. TUTTLE  2,356,802
ARC WELDING APPARATUS
Filed Sept. 10, 1943  2 Sheets-Sheet 1

Inventor:
Frank B. Tuttle.
by Harry E. Dunham
His Attorney.

Patented Aug. 29, 1944

2,356,802

UNITED STATES PATENT OFFICE 2,356,802

ARC WELDING APPARATUS

Frank B. Tuttle, Norristown, Pa., assignor to General Electric Company, a corporation of New York Application September 10, 1943, Serial No. 501,812

14 Claims. (Cl. 314—5)

My invention relates to arc welding and more particularly to apparatus for automatically supplying to the electrode feeding mechanism of arc welding apparatus a succession of unit length electrodes, each of which in turn is welded in end to end engagement with the unconsumed residue of unit length electrodes previously supplied to said feeding means and still subject to its feeding action so that a continuous unbroken length of electrode material may be supplied as needed to maintain an uninterrupted welding arc for as long as desired.

Unit length arc welding electrodes are primarily used for hand welding operations while electrodes in coils of indefinite length are generally used in automatic arc welding apparatus which controls electrode feed in accordance with an electrical characteristic of the welding arc. Automatic apparatus has been provided, however, for feeding unit length electrodes because the flux coating of certain electrodes is of a nature to prohibit coiling without destroying the flux coating and because the size and stiffness of other electrodes makes it difficult to feed them from a coil. Where the welding operation requires less than a unit length electrode for its completion the unconsumed or stub end loss may be considerable. Likewise where more than one unit length electrode is required to form a weld it is necessary to interrupt the welding operation and insert a new unit length electrode before completing the welding operation. Both of these features are objectionable and have been eliminated by joining in end to end engagement a plurality of unit length electrodes which are thereafter fed by the automatic apparatus as if they were a single electrode of the combined length of the succession of units of which it is formed. Various mechanical joints have been proposed for connecting these unit length electrodes and it has also been proposed to join them by welding since the use of mechanical joints introduces a high resistance section in the resultant electrode which adversely affects the automatic control used for feeding it.

It is an object of my invention to provide improved apparatus for performing this welding operation as an incident to the supply of unit length electrodes from a magazine to the electrode feeding mechanism of arc welding apparatus.

It is a further object of my invention to provide means by which the ends of the unit length electrodes are joined by a welding arc fed from a source of supply which is independent of the main source of supply used for fusing and depositing the electrodes so that the arc used for welding together unit length electrodes will not affect the uniform operation of the arc employed for depositing weld metal.

It is another object of my invention to provide apparatus in which a biasing means associated with the electrode carrier is energized by the travel of the carrier from a loading position at the magazine to a feeding position in line with the electrode feeding means where this biasing means becomes effective for feeding the new length of electrode contained therein into engagement with the electrode in the feeding means.

It is a further object of my invention to provide means, effective for a predetermined interval of time and responsive to the movement of an electrode in the carrier to a predetermined position, for supplying arc welding current across the adjoining ends of the electrodes in the carrier and in the feeding means, and for interrupting the feeding action of the biasing means on the electrode in the carrier to establish between the adjoining ends of these electrodes an arc gap which is subsequently closed by said biasing means to form a weld.

Further objects of my invention will become apparent from a consideration of the embodiment illustrated in the accompanying drawings.

In these drawings

In accordance with my invention, unit length electrodes stored in a magazine are transferred in succession one at a time to an electrode feeding means by a carrier which travels between a loading position at the magazine to a feeding position in which the electrode located in the carrier is aligned with an electrode in the feeding means. Means effective for a predetermined interval of time and responsive to the movement of the electrode in the carrier to a predetermined position are also provided in accordance with my invention for supplying welding current across the adjoining ends of electrodes in the carrier and in the feeding means and for interrupting the feeding action of the biasing means on the electrode in the carrier to establish between the adjoining ends of said electrodes an arcing gap which is subsequently closed by the biasing means to form a weld by means of which the electrode in the carrier becomes an integral part of the electrode in the feeding means whose length is thereby renewed so that the welding operation may proceed without interruption as the electrode in the feeding means is consumed. After this renewed length of electrode material has been withdrawn from the carrier, in accordance with my invention the carrier is swung to its loading position and again returned to its feeding position to repeat the operations above described. It is thus apparent that my apparatus supplies, in accordance with the need therefor, unit length electrodes which are integrally joined end to end by welding so that the resulting assembly acted on by the electrode feeding means becomes the equivalent of a continuous length of electrode material.

If my apparatus is employed for feeding unit length electrodes having electrically insulating flux coatings thereon, each electrode is suitably constructed for the supply of welding current thereto. For example, each electrode may have one of its ends slightly bared to accommodate a current conducting contact which engages the core of the electrode and extends beyond the outer surface of its flux coating so that when these electrodes are joined in end to end engagement, these contact devices constitute current conducting sections of the resulting electrode assembly through which current may be supplied thereto by any suitable contact mechanism.

Figure 1:
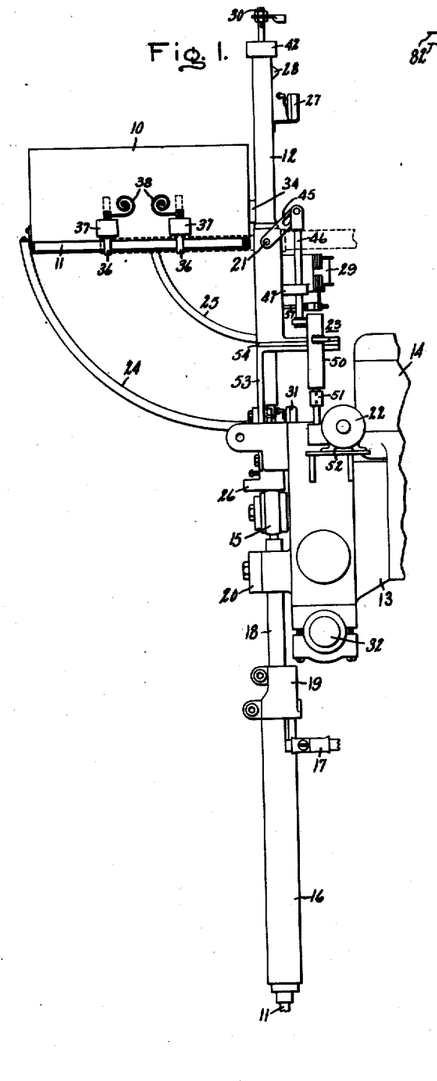
Fig. 1 is a side view of automatic arc welding apparatus embodying my invention.

The embodiment of my apparatus shown in Fig. 1 comprises a magazine 10 for holding a supply of unit length electrodes 11 which are transferred by a carrier 12 to a position in alignment with the unconsumed residue of unit length electrodes previously supplied to the feeding mechanism 13.

This feeding mechanism has been illustrated as an automatic arc welding head having the structure described and claimed in U. S. Letters Patent 2,170,673, Jasper E. Anderson, granted August 22, 1939, and assigned to General Electric Company, assignee of this application. As pointed out in this patent, its feed motor 14 may be suitably controlled in response to a characteristic of the welding arc to govern the speed and direction of rotation of its feed rolls 15 which engage the electrode therein and feed it in accordance with its consumption in the arc. These feed rolls may be provided with rubber treads and may have the construction shown in U. S. Letters Patent 2,272,158, Jasper E. Anderson, granted February 3, 1942, and assigned to General Electric Company, assignee of this application.

Welding current is supplied to the electrode in the feeding means by a contact mechanism 16 which is connected to one terminal of a source of supply through a conductor 17. This contact mechanism is supported on the welding head 18 through the agency of a tube 18, one end of which is attached to the contact mechanism 16 by a double clamp 19 and the other end of which is held in a bracket 20 forming part of the welding head. This contact mechanism may have the construction described and claimed in my application, Serial No. 501,813, for Arc welding apparatus, filed concurrently herewith.

The electrode carrier 12 is mounted on a shaft 21 for swinging movement about a transverse axis between the feeding position which it occupies in Fig. 1 and a loading position shown by dotted lines opposite the discharge opening in magazine 10. The movement of carrier 12 is controlled by a motor 22 which is connected to the carrier through a mechanism 23 which will be more fully described below.

In passing from its loading position to its feeding position the protruding end of an electrode in one end of carrier 12 engages a cam surface 24 by which it is moved into the carrier against the action of a biasing means located in the other end of the carrier until, at its feeding position, it is released for biased actuated movement into end to end engagement with the electrode in feeding means 13. During its transfer the electrode is held in carrier 12 by a member 25 which, like cam surface 24, extends between magazine 10 and the feeding position of the carrier.

After the biasing means in carrier 12 has fed the electrode therein until the joint between it and the electrode in feeding means 13 has passed into a guide 26, a limit switch 27 attached to the carrier is actuated by a cam 28 forming part of the biasing means. This switch forms part of a control circuit embodying an electrically operated mechanism 29 which for a predetermined interval of time arrests the bias actuated feeding movement imparted to the electrode in the carrier. At the same time limit switch 27 controls the supply of welding current across the adjoining ends of the electrodes in the carrier and in the feeding means to establish between their adjoining ends an arcing gap which is subsequently closed by the biasing means to form a weld between the electrodes. Welding current employed in this operation is supplied through a connection 30 forming part of the carrier structure and through conductor 17 which is also used for supplying welding current to contact mechanism 16.

A limit switch 31, also forming part of the control above referred to, operates motor 22 to swing carrier 12 from its feeding position to its loading position when the welded electrode assembly is withdrawn from carrier 12 by feeding means 13.

The means above described for automatically supplying to the electrode feeding means a succession of unit length electrodes which are welded in end to end engagement with the unconsumed residue of unit length electrodes previously supplied to the feeding means, is mounted on and forms a part of this feeding means. Contact mechanism 16, as previously stated, is also mounted on this feeding means. The feeding means itself may be adjustably mounted on a support embodying an arm 32.

Figures 2, 3, 4:
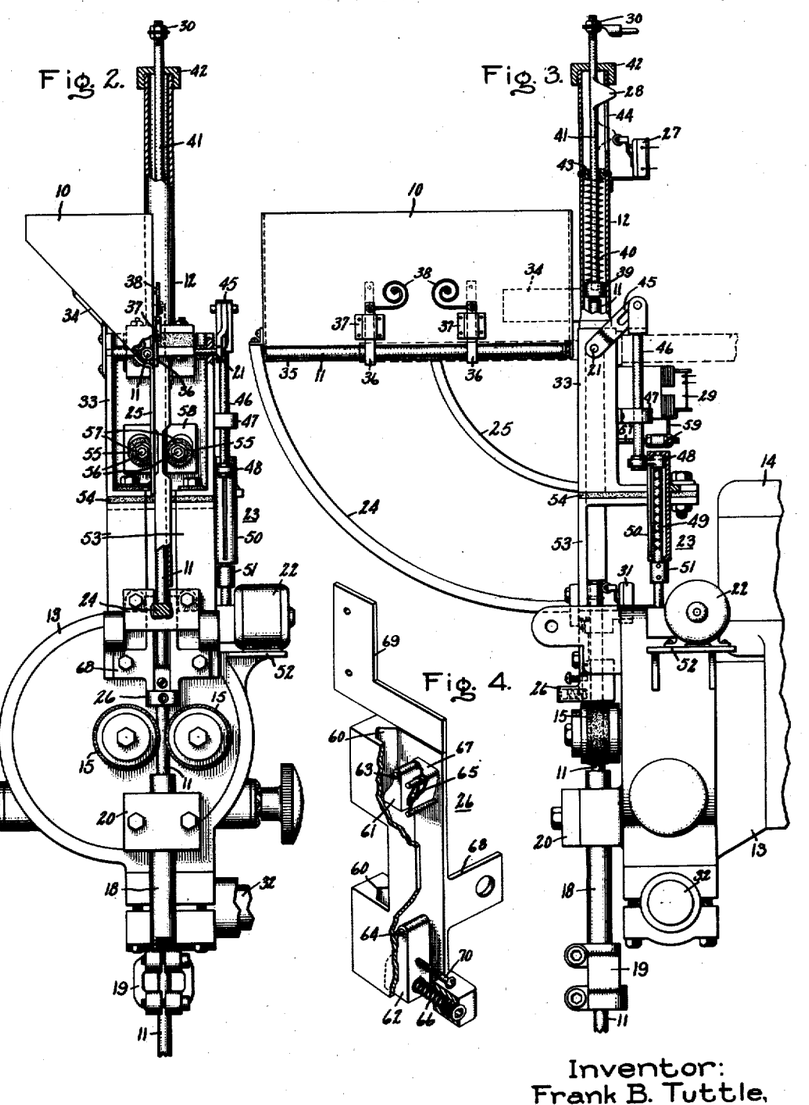
Figs. 2 and 3 are front and side views showing in greater detail the structural arrangements employed.
Fig. 4 is a perspective view of a guiding means employed for aligning the adjoining ends of electrodes in the carrier and in the feeding means of the apparatus illustrated in the previous figures.

Referring now to Figs. 2, 3 and 4 which show in greater detail the physical structure of the apparatus heretofore described by referring to Fig. 1, it will be noted that magazine 10 is attached to and supported on a channel-shaped member 33 by a bracket 34. This magazine is wedge-shaped in cross section and has an inclined side wall which feeds to the discharge opening 35 in its lower portion unit length electrodes contained in the magazine.

A gate biased to a closed position obstructs the passage of electrodes from the magazine through its discharge opening. In the arrangement illustrated this gate comprises a plurality of bars 36 mounted in brackets 37 on the front vertical wall of the magazine and biased to the position illustrated by springs 38. These bars are located in the path of travel of electrode carrier 12 which at its loading position engages and displaces them in their brackets 37 against the action of spring 38 to open the passageway 35 in the magazine for the discharge of an electrode into the electrode holding cavity in carrier 12.

One end of this electrode carrier is channel shaped in cross section and provides an electrode holding cavity having side and end openings for the reception and discharge of electrodes. In its loading position the side opening of the cavity is located opposite the discharge opening in the magazine and its end opening permits the electrode supplied to the carrier to extend therefrom for subsequent engagement with cam surface 24 previously referred to.

As the carrier passes from its loading position at the magazine to its feeding position illustrated in the drawings, the projecting end of the electrode therein engages cam surface 24 and is moved against a contact 39 which forms the inner end of the electrode cavity in carrier 12. This contact is biased by a spring 40 to a predetermined position which will not interfere with the passage of an electrode from magazine 10 to the cavity in carrier 12 when the carrier is in its loading position.

Contact 39 is mounted on one end of a rod 41 which extends through a cap 42 at the other end of the carrier. Welding current for joining the electrodes in end to end engagement is supplied to the inner end of the electrode in the carrier through contact 39, rod 41 and the connection 30 at its protruding end. Rod 41 is guided by the opening in cap 42 and the hole in washer 43 which, by reason of its attachment to carrier 12, forms an abutment for spring 40. A cam 26 attached to rod 41 extends through an opening 44 in the side wall of the carrier for engaging the operating member of limit switch 27 as it moves toward the other end of the carrier through the biasing action of spring 40.

Cam surface 24 is in fact a bracket attached at its lower end to the feeding means 13 and at its upper end to the end wall of magazine 10. As shown by the full line and dotted line positions of carrier 12 in Fig. 3, cam surface 24 is spaced from the end of the carrier in its loading position a greater distance than it is spaced therefrom in its feeding position. Consequently, when the carrier travels from its loading position to its feeding position, the electrode supplied thereto from magazine 10 engages cam surface 24 and is forced thereby lengthwise into the carrier and into end engagement with contact 39 against the biasing means constituted in the present instance by spring 40 and its associated parts.

Cam surface 24 extends up to but not across the feeding position of carrier 12 so that in this position of the carrier the electrode contained therein may be fed into end to end engagement with the electrode in the feeding means through the action of the biasing means previously energized by the movement of the carrier from its loading position to its feeding position.

Carrier 12 is attached to a shaft 21 which is mounted for rotation in the flanges of channel-shaped member 33. An arm 45 attached to one end of shaft 21, which extends beyond member 33, is employed for moving carrier 12 between its loading and feeding positions. This arm is actuated by a rod 46 which is mounted for lengthwise movement in a bracket 47 attached to member 33. One end of this rod 46 is attached through a pin and slot connection with the outer end of arm 45 and its other end is provided with a follower 48 having a threaded portion which engages the return thread screw on the upper end of a shaft 49 enclosed within a housing 50. The lower end of shaft 49 is connected through a coupling 51 with the armature shaft of motor 22 for rotation therewith. As shown in the drawings, motor 22 is mounted on a bracket 52 attached to the welding head 13. Housing 50 which also rotatably supports the upper end of shaft 49 is attached to the base portion of member 33.

From the description just given it is apparent that rotation imparted to shaft 49 by motor 22 will cause follower 48 to travel back and forth along shaft 49 and thereby impart lengthwise movement to rod 46 which in turn moves arm 45 to swing carrier 12 between its loading and feeding positions.

At this time it may be well to note that the lower portion of member 33 is mounted on and attached to the horizontally disposed arms of brackets 53 whose vertically disposed arms are attached to lugs forming part of the feeding means 13. A sheet of insulating material 54 electrically insulates support 33 from the welding head, and coupling 51 above referred to is also made of insulating material so that carrier 12 will be electrically insulated from welding head 13 for reasons that will subsequently become apparent.

Figure 6:
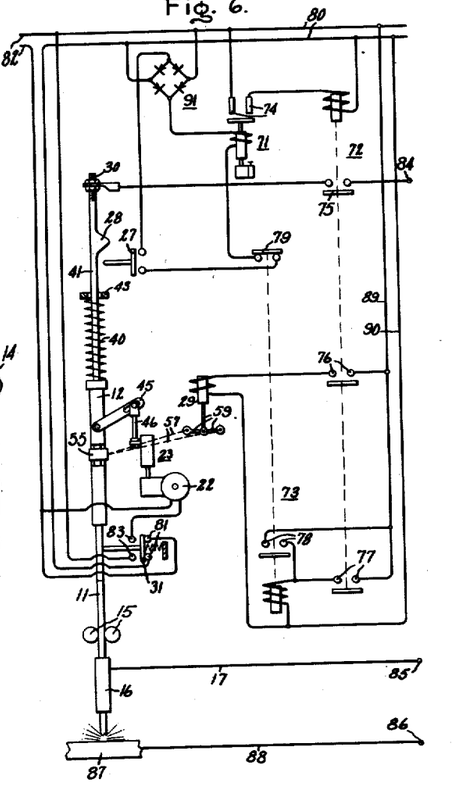
Fig. 6 is a diagrammatic view illustrating the electrical control for moving the electrode carrier from its loading position to its feeding position and thereafter welding electrodes in the carrier and in the feeding means in end to end engagement in response to the actuation of limit switches forming part of my improved apparatus.

The bias actuated feeding movement of the electrode in carrier 12 may be arrested when the carrier is in its feeding position by bringing arc striking rolls 55 into engagement therewith. As shown in Fig. 2, portions of electrode carrier 12 are cut away to expose the electrode therein to the action of these rolls. These rolls are held against rotation on pins 56 which are mounted in corresponding positions to one side of the centers of rotation of shafts 57. These shafts are journaled for rotation in a block 58 forming part of support 33. The portions of shafts 57 which extend through support 33 are of reduced cross section as shown in Fig. 3, and their ends are connected by links 59 to the armature of an electromagnet 29 whose coil and frame are mounted on support 33. The arrangement of links 59 is best shown in Fig. 6.

When the electromagnet 29 is energized, the crank supported rolls 55 move inwardly and upwardly to engage the electrode in carrier 12 and thereby arrest its travel or move it a predetermined distance against the action of the biasing means in the carrier. Rolls 55 are preferably made of a compressible material such as rubber so that their cranklike movement will displace the electrode in carrier 12 a predetermined distance against its biasing means. The operating winding of electromagnet 29 forms part of the control system including limit switches 27 and 31 previously referred to.

After the electrode in carrier 12 disengages cam surface 24, as previously stated, it is brought into end to end engagement with the unused residue of the electrode in feed rolls 15 of welding head 13 by reason of the movement imparted thereto by the biasing means of carrier 12. As the electrode in the feeding means is consumed, the electrode in carrier 12 will follow it until the ends of these electrodes are in guiding means 26 which is located between feed rolls 15 and the electrode holding end of carrier 12 when the carrier is in its feeding position.

The structure of guiding means 26 is best shown in Fig. 4. It comprises a frame having aligned guiding surfaces 60 against which the abutting ends of the electrodes are held by fingers 61 and 62. These fingers are supported for swinging movement about pins 63 and 64 which are supported in the frame of the guiding means and are biased to an electrode engaging position by springs 65 and 66 associated therewith. An angular shield 67 encloses the space between finger 61 and the pin supports for its biasing spring 65 so that electrodes supplied by carrier 12 may not enter this space if discharged so rapidly from the carrier that they do not first engage the upper guiding surface 60 of means 26.

Guiding means 26 is attached to the welding head 13 by bolts passing through lug 68 forming a part thereof. It is also provided with a bracket 69 upon which limit switch 31 is mounted. The operator may move finger 62 against the bias of its spring 66 by pulling on a screw 70 which is threaded into its body portion.

Depending upon the contact mechanism 16 employed, it is obvious from what has been stated above that the apparatus described is suitable for feeding bare or flux coated unit length electrodes. When the electrodes have insulating flux coatings thereon, each electrode may, as pointed out above, have one of its ends bared to accommodate a current conducting contact which engages the core of the electrode and extends beyond the outer surface of its flux coating so that when corresponding electrodes are joined in end to end engagement these contact devices constitute current conducting sections of the resulting electrode assembly. Current may be supplied through these conducting sections to the electrode assembly by a contact mechanism which provides a substantially continuous contact zone of a length exceeding the distance between the conductive sections thus formed. Such a joint embodying a current conducting contact has been illustrated in Fig. 5. This joint comprises a ring of conducting material 92 placed upon the core 93 of each unit length electrode 11 at its bared end portion. This ring constitutes the conducting contact section by which current is supplied to the welded assembly when corresponding electrodes are joined in end to end engagement by the operation of my apparatus.

The operation of the mechanism thus far described is under the control of limit switches 27 and 31, also forming part of an electrical control which is diagrammatically illustrated in Fig. 6 and which forms an integral part of my apparatus. Carrier 12 and the parts associated therewith, feed rolls 15 of welding head 13, and contact mechanism 16, previously described, have also been diagrammatically represented in this figure.

The electrical control illustrated in Fig. 6 embodies relays 71, 72, and 73.

Relay 71 has a time delay opening characteristic and through its contacts 74 controls the energization of relay 72. Relay 72 through its contacts 75 controls the supply of welding current across the adjoining ends of electrodes in carrier 12 and in feeding means 15. This relay also controls through its contacts 76 the energization of the operating winding of electromagnet 29 which when energized arrests or reverses the travel imparted to the electrode in carrier 12 by its biasing means 40. Relay 72 through its contacts 77 controls the energization of the operating winding of relay 73. Once energized, relay 73 completes its holding circuit through its contacts 78 and opens its contacts 79 to deenergize the operating winding of relay 71. The operating winding of relay 71 is connected across the output terminals of a rectifier 91 through contacts 79 of relay 73 and the normally open contacts of limit switch 27. The input terminals of this rectifier are connected across conductors 80.

Relays 72 and 73, as well as electromagnet 29, are energized through conductors 80 which are connected through normally open contacts 81 of limit switch 31 to a source of alternating current supply 82. Normally closed contacts 83 of limit switch 31 connect the electrode carrier motor 22 to the same source of supply 82.

Terminals 84 and 85 are connected to a source of supply suitable for arc welding the abutting ends of electrodes in carrier 12 and in feeding means 15, and terminals 85 and 86 are connected to a source of welding current which is suitable for fusing and depositing electrode material on the work 87 which is connected through a conductor 88 to terminal 86.

In view of the above preliminary description the organization of the system shown in Fig. 6 will be further described by now considering its operation.

When carrier 12 is swung to its feeding position illustrated in Fig. 6, electrode 11 in carrier 12 is fed by the biasing means embodying spring 40 into end to end engagement with electrode 11 in feed rolls 15 of welding head 13. The movement of carrier 12 to its feeding position brings the protruding end of the electrode therein into engagement with the operating member of limit switch 31 and causes this switch to close its normally open contacts 81. The closure of contacts 81 of limit switch 31 connects conductors 80 to the source of supply 82.

After electrode 11 in feed rolls 15 has been fed to a position in which the abutting ends between it and the electrode in carrier 12 are in a desired position in guiding means 26 previously described in connection with the structure shown in Figs. 1, 2 and 3, cam 28 on rod 41 of the biasing means engages and closes the normally open contacts of limit switch 27. The closure of this switch connects the operating winding of relay 71 across the energized conductors 80 through contacts 79 of relay 73 and rectifier bridge 91.

Relay 71 consequently closes its contacts 74 and energizes the operating winding of relay 72 by connecting it across energized conductors 80. This relay, by closing its contacts 75, applies the source of welding current between terminals 84 and 85 to the electrodes in carrier 12 and feed rolls 15. The circuit is completed from terminal 84 of this source through contact 75 of relay 72, connection 30, rod 41, contact 39 (Fig. 3), the electrode in carrier 12, the electrode in feed rolls 15 and contact mechanism 16 through conductor 17 to the other terminal 85 of this source.

Simultaneously with the closure of its contacts 75, relay 72 also closes its contacts 76. The closure of these contacts connects the operating winding of electromagnet 29 across energized conductors 80 through conductors 89 and 90. The electromagnet consequently picks up its armature and operates rolls 55 to bring them into engagement with the electrode in carrier 12 and arrest its travel or move it against the action of spring 40 of the biasing means to create an arcing gap between the abutting ends of the electrodes in the carrier and in feed rolls 15. If the travel of the electrode in carrier 12 is arrested without moving it against the action of spring 40, the consumption and consequent feed of the electrode in feed rolls 15 will, it is obvious, establish this arcing gap.

The energization of relay 72 also causes it to close its contacts 77 and energize the operating winding of relay 73 by connecting it across energized conductors 80 through conductors 89 and 90. Relay 73 thereupon closes its contacts 78 to complete and maintain its holding circuit across energized conductors 80 through conductors 89 and 90. Relay 73 also opens its contacts 79 deenergizing relay 71 even though limit switch 27 may still have its contacts closed by cam 28 on rod 41.

After a predetermined time interval, relay 71 opens its contacts 74 deenergizing relay 72 which thereupon opens its contacts 75, 76 and 77. The opening of its contacts 75 discontinues the flow of welding current from the source connected to terminals 84 and 85 and thereby interrupts the arcing contact between the electrodes in carrier 12 and feed rolls 15. The opening of its contact 76 deenergizes electromagnet 29 which then releases the electrode in carrier 12 to the action of its biasing means which brings the molten ends of the electrodes in the carrier and in the feed rolls 15 into engagement with one another to complete the weld between them. The opening of contacts 77 of relay 72 does not deenergize relay 73 since, as previously stated, this relay is maintained energized through its holding contacts 78.

When the welded assembly thus produced between them the electrodes in carrier 12 and in feed rolls 15 has been withdrawn from the carrier past the operating member of limit switch 31, this switch opens its normally open contacts 81 and closes its normally closed contacts 83. The opening of contacts 81 deenergizes relay 73, and the closure of contacts 83 energizes carrier motor 22 which operates to swing carrier 12 from its feeding position to a loading position opposite magazine 12 where another electrode is supplied thereto. The continued operation of motor 22 then swings the carrier to its feeding position where the protruding end of the electrode in the carrier again operates limit switch 31 to stop motor 22 and reenergize conductors 80 from source 82. Thereafter another cycle of operation is completed in the manner above described.

It is thus apparent that my apparatus supplies in accordance with the need therefor unit length electrodes which are integrally joined end to end by welding so that the resulting assembly acted on by the electrode feeding means becomes the equivalent of a continuous length of electrode material. Unit length electrodes may, therefore, be used for performing any desired welding operation without waste of electrode material and without interruption of the welding operation.

Figure 5:
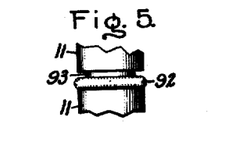
Fig. 5 is a view showing in one type of flux coated unit length electrode in which a conductive ring located at the welded joint between two lengths thereof is employed for supplying welding current to the assembly through the agency of a contact mechanism forming part of the apparatus illustrated in Fig. 1.

It is also apparent that unit length electrodes having insulating flux coating thereon need not have the construction illustrated and described above to be suitable for use in my apparatus. Instead of the contact rings 92 described above, any suitable contact means mounted on or forming a part of the electrode core may be used for supplying current thereto. In fact, the current carrying contact or contacts of each length of electrode material may be spaced several inches from their ends so that their usefulness as contacts will not be impaired by the welding operation employed for joining the lengths of electrode material in end to end engagement.

The single embodiment illustrated in the drawings may be variously modified without departing from the spirit and scope of my invention. Thus electrodes may be loaded into the electrode carrier by means other than that described. Furthermore, instead of the spring operated biasing means illustrated as forming a part of the carrier, a weight actuated biasing means may be employed. Likewise, means other than the cam surface illustrated and described may be employed for moving an electrode in the carrier against the action of the biasing means to energize it. One obvious arrangement comprises an electromagnet which acts directly on the electrode or through the agency of an electrode engaging means. Furthermore, the electrical control illustrated in Fig. 6 may be variously modified in order to establish different methods of welding the electrodes in end to end engagement. It is obvious that irrespective of how performed any welded union will accomplish my purpose of feeding unit length electrodes which are integrally joined end to end by welding so that the resulting assembly acted on by the electrode feeding means becomes the equivalent of a continuous length of electrode material. This and other modifications will occur to those skilled in the art.

Thus while I have shown and described but one embodiment of my invention, such modification and variations are contemplated as fall within the spirit and scope of my invention as set forth in the appended claims.

What I claim as new and desire to secure by Letters Patent of the United States, is:

1. Automatic arc welding apparatus comprising an electrode carrier, means for supporting said carrier for movement between electrode loading and electrode feeding positions, means at one end of said carrier for biasing an electrode therein to a predetermined position lengthwise thereof, means at the loading positions of said carrier for supplying an electrode thereto beyond the range of action of said biasing means, means responsive to the movement of said carrier from its loading position to its feeding position for displacing an electrode therein against the action of said biasing means and thereafter releasing said electrode to the feeding action of said biasing means when said carrier arrives at its feeding position, electrode feeding means opposite the other end of said carrier when said carrier is in its feeding position, and means effective for a predetermined interval of time and responsive to the movement of an electrode in said carrier to a predetermined position for supplying welding current across the adjoining ends of electrodes in said carrier and in said feeding means and for interrupting the feeding action of said biasing means on the electrode in said carrier to establish between the adjoining ends of said electrodes an arcing gap which is subsequently closed by said biasing means to form a weld.

2. Automatic arc welding apparatus comprising an electrode carrier, means for supporting said carrier for movement between electrode loading and electrode feeding positions, means at one end of said carrier for biasing an electrode therein to a predetermined position lengthwise thereof, means at the loading position of said carrier for supplying an electrode thereto beyond the range of action of said biasing means, means responsive to the movement of said carrier from its loading position to its feeding position for displacing an electrode therein against the action of said biasing means and thereafter releasing said electrode to the feeding action of said biasing means when said carrier arrives at its feeding position, electrode feeding means opposite the other end of said carrier when said carrier is in its feeding position, means effective for a predetermined interval of time and responsive to the movement of an electrode in said carrier to a predetermined position for supplying welding current across the adjoining ends of electrodes in said carrier and in said feeding means and for interrupting the feeding action of said biasing means on the electrode in said carrier to establish between the adjoining ends of said electrodes an arcing gap which is subsequently closed by said biasing means to form a weld, and means for moving said carrier from its feeding position to its loading position and then returning it to its feeding position in response to the withdrawal of the welded electrode assembly from said carrier to a predetermined position by said feeding means.

3. Automatic arc welding apparatus comprising a magazine for storing unit length electrodes, means for lengthwise feeding an assembly of said electrodes formed by joining them end to end by welding, a carrier for transferring one of said electrodes from a loading position at said magazine to a feeding position in line with the travel of said electrode assembly through said feeding means, means operative in the loading position of said carrier for transferring one of said electrodes from said magazine to said carrier, means in said carrier for biasing said electrode therein to a predetermined position, means actuated by the movement of said carrier from its loading position to its feeding position for displacing said electrode lengthwise of said carrier against the action of said biasing means and then releasing said electrode to the action of said biasing means for lengthwise travel into end to end engagement with the last section of said electrode assembly in said feeding means when said carrier is in its feeding position, means responsive to the movement of said electrode in said carrier to a predetermined position for welding its end to the adjoining end of the last section of the electrode assembly in said feeding means, and means responsive to the withdrawal of the newly formed last section of said electrode assembly from said carrier to a predetermined position for moving said carrier to its loading position and returning it again to its feeding position.

4. Automatic arc welding apparatus comprising a magazine having a discharge opening through which unit length electrodes stored therein are supplied one at a time in side by side arrangement, means for lengthwise feeding an assembly of said electrodes formed by joining them end to end by welding, a carrier for transferring one of said electrodes from a loading position opposite said discharge opening of said magazine to a feeding position in line with the travel of said electrode assembly through said feeding means, means in said carrier for biasing said electrode therein to a predetermined position, means actuated by said carrier in its loading position for transferring one of said electrodes from said magazine to said carrier beyond the range of action of said biasing means, means actuated by the movement of said carrier from its loading position to its feeding position for displacing said electrode lengthwise of said carrier against the action of said biasing means and thereafter releasing it to the action of said biasing means for lengthwise travel into end to end engagement with the last section of said electrode assembly in said feeding means when said carrier is in its feeding position, means responsive to the movement of said electrode in said carrier to a predetermined position by said biasing means for welding its end to the adjoining end of the last section of the electrode assembly in said feeding means, and means responsive to the withdrawal of the newly formed last section of said electrode assembly from said carrier to a predetermined position for moving said carrier to its loading position and returning it again to its feeding position.

5. Automatic arc welding apparatus comprising a magazine for storing unit length electrodes, means for lengthwise feeding an assembly of said electrodes formed by joining them end to end by welding, a carrier for transferring one of said electrodes from a loading position at said magazine to a feeding position in line with the travel of said electrode assembly through said feeding means, means operative in the loading position of said carrier for transferring one of said electrodes from said magazine to said carrier, means in said carrier for biasing said electrode therein to a predetermined position, means actuated by the movement of said carrier from its loading position to its feeding position for displacing said electrode lengthwise of said carrier against the action of said biasing means and then releasing said electrode to the action of said biasing means for lengthwise travel into end to end engagement with the last section of said electrode assembly in said feeding means when said carrier is in its feeding position, means for supplying welding current across the abutting ends of said electrode in said carrier and said last section of said electrode assembly in said feeding means, means for arresting the travel of said electrode in said carrier for a predetermined interval of time and thereafter restoring it to the action of said biasing means, means responsive to the movement of said electrode in said carrier to a predetermined position for operating said last two mentioned means and thereby welding it to said electrode assembly in said feeding means to add a new length thereto, and means responsive to the withdrawal of said new length of said electrode assembly from said carrier to a predetermined position for moving said carrier to its loading position and returning it again to its feeding position.

6. Automatic arc welding apparatus comprising a magazine having a discharge opening through which unit length electrodes stored therein are supplied one at a time in side by side arrangement, means for lengthwise feeding an assembly of said electrodes formed by joining them end to end by welding, a carrier for transferring one of said electrodes from a loading position opposite said discharge opening of said magazine to a feeding position in line with the travel of said electrode assembly through said feeding means, means in said carrier for biasing said electrode therein to a predetermined position, means actuated by said carrier in its loading position for transferring one of said electrodes from said magazine to said carrier beyond the range of action of said biasing means, means actuated by the movement of said carrier from its loading position to its feeding position for displacing said electrode lengthwise of said carrier against the action of said biasing means and thereafter releasing it to the action of said biasing means for lengthwise travel into end to end engagement with the last section of said electrode assembly in said feeding means when said carrier is in its feeding position, means responsive to the movement of said electrode in said carrier by said biasing means to a predetermined position for completing a welding circuit through the abutting ends of said electrode in said carrier and said last section of said electrode assembly in said feeding means and moving the said electrode in said carrier against said biasing means away from said electrode assembly in said feeding means to establish an arc between their adjoining ends, means actuated by said last mentioned means for releasing said electrode in said carrier to the action of said biasing means and interrupting the supply of welding current to said electrodes to bring them into end to end engagement and thereby weld a new length to said electrode assembly in said feeding means, and means responsive to the withdrawal by said feeding means of said new length of said electrode assembly from said carrier to a predetermined position for moving said carrier to its loading position and returning it again to its feeding position.

7. Automatic arc welding apparatus comprising an electrode carrier, means for supporting said carrier for movement between electrode loading and electrode feeding positions, means at one end of said carrier for biasing an electrode therein to a predetermined position lengthwise thereof, means at the loading position of said carrier for supplying an electrode thereto beyond the range of action of said biasing means, means responsive to the movement of said carrier from its loading position to its feeding position for displacing against the action of said biasing means an electrode supplied thereto by said last mentioned means and thereafter releasing said electrode to the feeding action of said biasing means when said carrier arrives at its feeding position, electrode feeding means opposite the other end of said carrier when said carrier is in its feeding position, and means responsive to the movement of an electrode in said carrier to a predetermined position under the action of said biasing means for interrupting the feeding action of said biasing means and supplying welding current to electrodes in said carrier and in said feeding means to establish an arcing gap between their adjoining ends and thereafter interrupting said flow of welding current and reestablish the feeding action of said biasing means to bring the adjoining ends of said electrodes together again to form a welded union.

8. Automatic arc welding apparatus comprising an electrode carrier, means for supporting said carrier for movement between electrode loading and electrode feeding positions, means at one end of said carrier for biasing an electrode therein to a predetermined position lengthwise thereof, means at the loading position of said carrier for supplying an electrode thereto beyond the range of action of said biasing means, means responsive to the movement of said carrier from its loading position to its feeding position for displacing against the action of said biasing means an electrode supplied thereto by said last mentioned means and thereafter releasing said electrode to the feeding action of said biasing means when said carrier arrives at its feeding position, electrode feeding means opposite the other end of said carrier when said carrier is in its feeding position, means responsive to the movement of an electrode in said carrier to a predetermined position under the action of said biasing means for interrupting the feeding action of said biasing means and supplying welding current to electrodes in said carrier and in said feeding means to establish an arcing gap between their adjoining ends and thereafter interrupting said flow of welding current and reestablishing the feeding action of said biasing means to bring the adjoining ends of said electrodes together again to form a flash welded union, and means responsive to the withdrawal from said carrier of the electrode therein for moving said carrier to its loading position and then returning it to its feeding position.

9. Automatic arc welding apparatus comprising a carrier having an electrode cavity extending lengthwise thereof from one of its ends, a current conducting contact movable lengthwise of the other end of said carrier and defining the inner end of said electrode cavity in said carrier, means for biasing said contact to a position in which said electrode cavity is of shorter length than the electrode it is adapted to carry, means for supporting said carrier for swinging movement about a transverse axis between a loading position and a feeding position, means at said loading position for inserting an electrode into said cavity of said carrier, electrode feeding means in line with an electrode in said cavity of said carrier when said carrier is in its feeding position, a cam surface which during the travel of said carrier from its loading position to its feeding position engages the projecting end of an electrode in said carrier and displaces said electrode lengthwise thereof into engagement with said contact against the action of said biasing means and at said loading position releases said electrode to the action of said biasing means for lengthwise travel into engagement with the end of an electrode in said feeding means, means at the feeding position of said carrier for engaging an electrode therein and moving it a predetermined distance against the action of said biasing means, means for supplying welding current through said contact and across the adjoining ends of electrodes in said carrier and said feeding means, and means responsive to the movement of an electrode in said carrier to a predetermined position under the action of said biasing means for operating said last two mentioned means and thereby welding together the adjoining ends of electrodes in said carrier and in said feeding means.

10. Automatic arc welding apparatus comprising a carrier having an electrode cavity extending lengthwise thereof from one of its ends, a current conducting contact movable lengthwise of the other end of said carrier and defining the inner end of said electrode cavity in said carrier, means for biasing said contact to a position in which said electrode cavity is of shorter length than the electrode it is adapted to carry, means for supporting said carrier for swinging movement about a transverse axis between a loading position and a feeding position, means at said loading position for inserting an electrode into said cavity of said carrier, electrode feeding means in line with an electrode in said cavity of said carrier when said carrier is in its feeding position, guiding means located between said feeding means and said carrier in its feeding position for holding in alignment adjoining ends of electrodes in said feeding means and in said carrier, a cam surface located in the plane of rotation of said carrier and curved inward toward its axis of rotation up to its feeding position, said surface being arranged to engage the projecting end of an electrode in said carrier and move said electrode lengthwise thereof into engagement with said contact and against the action of said biasing means before releasing it at the feeding position of said carrier to the action of said biasing means, for movement into end to end engagement with an electrode in said feeding means, means at the feeding position of said carrier for engaging an electrode therein and moving it a predetermined distance against the action of said biasing means, means for supplying welding current through said contact and across the adjoining ends of electrodes in said carrier and said feeding means, and means responsive to said bias actuated movement of an electrode in said carrier to a position in which the joint between the end of said electrode in said carrier and the adjoining end of an electrode in said feeding means is located in said guiding means for operating said last two mentioned means and thereby welding together the adjoining ends of said electrodes.

11. Automatic arc welding apparatus comprising a carrier having an electrode cavity extending lengthwise thereof from one of its ends, a current conducting contact movable lengthwise of the other end of said carrier and defining the inner end of said electrode cavity in said carrier, means for biasing said contact to a position in which said electrode cavity is of shorter length than the electrode it is adapted to carry, means for supporting said carrier for swinging movement about a transverse axis between a loading position and a feeding position, means at said loading position for inserting an electrode into said cavity of said carrier, electrode feeding means in line with an electrode in said cavity of said carrier when said carrier is in its feeding position, means effective during movement of said carrier from its loading position to its feeding position for lengthwise moving an electrode in said carrier against the action of said biasing means to energize said biasing means and then releasing said electrode to the action of said biasing means when said carrier is in its feeding position to propel said electrode lengthwise of said carrier in the reverse direction into end to end engagement with an electrode in said feeding means, means at the feeding position of said carrier for engaging an electrode therein and moving it a predetermined distance against the action of said biasing means, means for supplying welding current through said contact and across the adjoining ends of electrodes in said carrier and said feeding means, means responsive to the movement of an electrode in said carrier to a predetermined position under the action of said biasing means for operating said last two mentioned means and thereby uniting by welding the adjoining ends of electrodes in said carrier and in said feeding means, and means responsive to the withdrawal from said carrier by said feeding means of the electrode therein for swinging said carrier to its loading position and then returning it to its feeding position.

12. Automatic arc welding apparatus comprising means for feeding a series of unit length electrodes welded together in end to end engagement, a magazine having a discharge opening through which said electrodes stored therein are supplied one at a time in side by side arrangement, a carrier having in one end an electrode holding cavity provided with side and end openings for the reception and discharge of said electrodes and in its other end a current conductive contact movable lengthwise thereof and defining the inner end of said cavity, means for biasing said contact to a position in which said electrode holding cavity is of shorter length than said electrodes, a gate biased to a closed position obstructing the passage of electrodes from said magazine through its said discharge opening and movable to an open position by engagement with said electrode carrier when said carrier is moved to its loading position in which the electrode holding cavity defined by said predetermined position of said contact in said carrier is opposite one end of the discharge opening in said magazine and communicates therewith through the side opening in said carrier, means for supporting said carrier for swinging movement about a transverse axis between said loading position and a feeding position in which the projecting end of the electrode in said carrier is located in line with said electrode feeding means, a cam surface in the plane of rotation of said carrier in position to engage the projecting end of an electrode therein and displace it lengthwise thereof into engagement with said contact against the action of said biasing means during travel of said carrier from its loading position to its feeding position where it releases said electrode to the action of said biasing means for lengthwise travel into engagement with the end of the last of said series of electrodes in said feeding means, and means responsive to the movement of an electrode in said carrier to a predetermined position under the action of said biasing means for uniting by welding the adjoining ends of electrodes in said carrier and in said feeding means, said means establishing the flow of welding current through said contact and said electrode across their adjoining ends, arresting the action of said biasing means to form an arcing gap between the adjoining ends of said electrodes and a predetermined interval of time after said arcing gap has been established interrupting said flow of welding current and restoring the action of said biasing means to bring the adjoining ends of said electrodes into welding engagement with one another.

13. Automatic arc welding apparatus comprising means for feeding a series of unit length electrodes welded together in end to end engagement, a magazine having a discharge opening through which said electrodes stored therein are supplied one at a time in side by side arrangement, a carrier having in one end an electrode holding cavity provided with side and end openings for the reception and discharge of said electrodes and in its other end a current conductive contact movable lengthwise thereof and defining the inner end of said cavity, means for biasing said contact to a position in which said electrode holding cavity is of shorter length than said electrodes, a gate biased to a closed position obstructing the passage of electrodes from said magazine through its said discharge opening and movable to an open position by engagement with said electrode carrier when said carrier is moved to its loading position in which the electrode holding cavity defined by said predetermined position of said contact in said carrier is opposite one end of the discharge opening in said magazine and communicates therewith through the side opening in said carrier, means for supporting said carrier for swinging movement about a transverse axis between said loading position and a feeding position in which the projecting end of the electrode in said carrier is located in line with said electrode feeding means, a cam surface in the plane of rotation of said carrier in position to engage the projecting end of an electrode therein and displace it lengthwise thereof into engagement with said contact against the action of said biasing means during travel of said carrier from its loading position to its feeding position where it releases said electrode to the action of said biasing means for lengthwise travel into engagement with the end of the last of said series of electrodes in said feeding means, guiding means located between said feeding means and said carrier in its feeding position for holding in alignment the adjoining ends of electrodes in said feeding means and in said carrier, and means responsive to the movement of said contact to a position in which the adjoining ends of electrodes in said carrier and in said feeding means are located in said guiding means for uniting said ends by welding, said means establishing the flow of welding current through said contact and said electrode across their adjoining ends, arresting the action of said biasing means to form an arcing gap between the adjoining ends of said electrodes and a predetermined interval of time after said arcing gap has been established interrupting said flow of welding current and restoring the action of said biasing means to bring the adjoining ends of said electrodes into welding engagement with one another.

14. Automatic arc welding apparatus comprising means for feeding a series of unit length electrodes welded together in end to end engagement, a magazine having a discharge opening through which said electrodes stored therein are supplied one at a time in side by side arrangement, a carrier having in one end an electrode holding cavity provided with side and end openings for the reception and discharge of said electrodes and in its other end a current conductive contact movable lengthwise thereof and defining the inner end of said cavity, means for biasing said contact to a position in which said electrode holding cavity is of shorter length than said electrodes, a gate biased to a closed position obstructing the passage of electrodes from said magazine through its said discharge opening and movable to an open position by engagement with said electrode carrier when said carrier is moved to its loading position in which the electrode holding cavity defined by said predetermined position of said contact in said carrier is opposite one end of the discharge opening in said magazine and communicates therewith through the side opening in said carrier, means for supporting said carrier for swinging movement about a transverse axis between said loading position and a feeding position in which the projecting end of the electrode in said carrier is located in line with said electrode feeding means, a cam surface in the plane of rotation of said carrier in position to engage the projecting end of an electrode therein and displace it lengthwise thereof into engagement with said contact against the action of said biasing means during travel of said carrier from its loading position to its feeding position where it releases said electrode to the action of said biasing means for lengthwise travel into engagement with the end of the last of said series of electrodes in said feeding means, guiding means located between said feeding means and said carrier in its feeding position for holding in alignment the adjoining ends of electrodes in said feeding means and in said carrier, means responsive to the movement of said contact to a position in which the adjoining ends of electrodes in said carrier and in said feeding means are located in said guiding means for uniting said ends by welding, said means establishing the flow of welding current through said contact and said electrode across their adjoining ends, arresting the action of said biasing means to form an arcing gap between the adjoining ends of said electrodes and a predetermined interval of time after said arcing gap has been established interrupting said flow of welding current and restoring the action of said biasing means to bring the adjoining ends of said electrodes into welding engagement with one another, and means for swinging said carrier from its feeding position to its loading position and then returning it again to its feeding position in response to the withdrawal from said carrier by said feeding means of the last of said renewed series of electrodes.

FRANK B. TUTTLE.